United States Patent [19]
Burstein et al.

[11] Patent Number: 5,463,224
[45] Date of Patent: Oct. 31, 1995

[54] X-RAY DETECTOR SUITED FOR HIGH ENERGY APPLICATIONS WITH WIDE DYNAMIC RANGE, HIGH STOPPING POWER AND GOOD PROTECTION FOR OPTO-ELECTRONIC TRANSDUCERS

[75] Inventors: Paul Burstein, Winchester; Allen S. Krieger, Lexington; Klaus Kubierschky, North Reading, all of Mass.

[73] Assignee: American Science and Engineering, Inc., Cambridge, Mass.

[21] Appl. No.: 880,630

[22] Filed: Jul. 1, 1986

[51] Int. Cl.⁶ ................................................ G01T 1/202
[52] U.S. Cl. ................ 250/366; 250/370.11; 250/370.09
[58] Field of Search .............................. 250/370 C, 368, 250/367, 366, 370 I

[56] References Cited

U.S. PATENT DOCUMENTS

| Re. 28,544 | 9/1975 | Stein et al. | 378/146 |
|---|---|---|---|
| 3,790,799 | 2/1974 | Stein et al. | 378/146 |
| 3,912,933 | 10/1975 | Van Stappen | 250/475.2 |
| 3,978,337 | 8/1976 | Nickels et al. | 250/367 |
| 4,234,792 | 11/1980 | DeCou et al. | 250/368 |
| 4,247,774 | 1/1981 | Brooks | 250/367 |
| 4,303,860 | 12/1981 | Bjorkholm et al. | 250/366 |
| 4,429,227 | 1/1984 | DiBianca et al. | 250/367 |
| 4,491,732 | 1/1985 | Pritzkow et al. | 250/368 |
| 4,535,243 | 8/1985 | Peschmann | 250/363 S |

Primary Examiner—Carolyn E. Fields
Attorney, Agent, or Firm—Pollock, Vande Sande & Priddy

[57] ABSTRACT

An x-ray detector includes a solid scintillating crystal of cadmium tungstate or bismuth germanate; the crystal is mounted in an x-radiation field and includes a first region directly exposed to the x-radiation. A protective shield is arranged adjacent the crystal so as to protect a region in space from direct exposure to x-radiation. The crystal includes a second component which is located in the protected region of space and is thus not exposed to direct x-radiation. Located in contact with opposing faces of the crystal are two pairs of photodiodes, the photodiodes themselves as well as the crystal faces with which they are in contact lie in the protected region in space and therefore are not exposed to direct x-radiation. The photodiodes themselves are also protected from scattered x-radiation by the protected component of the crystal. One pair of photodiodes has equal active areas, which is however different from the active areas of the other pair of photodiodes. All the photodiodes have anode and cathode leads, and corresponding leads for the diodes in each pair are connected together.

17 Claims, 2 Drawing Sheets

X-RAY DETECTOR SUITED FOR HIGH ENERGY APPLICATIONS WITH WIDE DYNAMIC RANGE, HIGH STOPPING POWER AND GOOD PROTECTION FOR OPTO-ELECTRONIC TRANSDUCERS

CROSS REFERENCE TO RELATED APPLICATION

The present application describes an x-ray detector which can be used in the CT imaging system described in application Ser. No. 589,443, now U.S. Pat. No. 4,691,332, filed Mar. 14, 1984 and assigned to the assignee of this application.

FIELD OF THE INVENTION

The present invention relates to x-ray detectors, particularly x-ray detectors which are suited for high energy (on the order of 1 million electron volts or more) imaging having the characteristics of wide dynamic range, high stopping power and good protection for opto-electronic transducers such as photodiodes.

BACKGROUND ART

The general requirements for x-ray detectors are well known. In general, some scintillating material is employed which reacts to impinging x-ray photons to create optical photons. In some fashion, the optical photons are typically conducted to an opto-electronic transducer such a photomultiplier or a photodiode, where the optical photons are converted to electrical energy which can be responded to by other, well known electronic components.

Typical x-ray intensities employed in the medical field are on the order of 100 Kev. The present invention is directed at applications requiring substantially higher x-ray intensities, for example 1 Mev or more. The substantially higher x-ray intensities result in a number of problems that have to be overcome which are not met or at least easily overcome in the lower x-ray intensity employed in the medical field.

In the first place, the much higher x-ray intensity requires a detector with increased stopping power. For example, if we were to use a detector suitable for about 100 Kev (such as those used in the medical field) imaging, the much higher (1 Mev or more) x-rays would simply pass through the detector with little or no effect. It is also well known that stopping power can be increased by increasing the thickness of the detector along the direction of the x-ray beam. However, when we increase the thickness of the detector, we want to do it in such a way as not to degrade resolution.

A second problem is the location of the opto-electronic transducers (whether photomultipliers, photodiodes or the like). In order to perform their function, it is essential that the optical photons created in the scintillating material be coupled to the opto-electronic transducers. Transferring the optical-photons from the scintillating material to a light coupler and then to the opto-electronic transducer requires at least two interfaces, and optical photons are lost at each of the interfaces, degrading the signal eventually produced by the opto-electronic transducer. Furthermore, in deciding where to locate the opto-electronic transducers, account must also be taken of the damage that can be done to such transducers by exposure to the x-ray energy. Accordingly, the two problems in this area relate how the optical photons are to be coupled to the opto-electronic transducer and secondly, how the opto-electronic transducers can be located without subjecting them to physical degradation caused by exposure to the x-ray energy.

Furthermore, while we desire to increase the thickness of the scintillating material (so as to provide for sufficient stopping power to detect the impinging x-ray photons) since we are dealing with real materials, we cannot simply increase one dimension, without corresponding increases in other dimensions. Increasing the size of the scintillating material in these other dimensions leads to the possibility that optical photons created in the scintillating material may not reach the location at which they are coupled to the opto-electronic transducer, thus leading to the possibility that the electronic signals will depend in part on the location of the impinging x-ray energy on the scintillating material, giving rise to signal artifacts which are undesirable.

Finally, still another problem to be overcome is the wide dynamic range which is required of the opto-electronic transducers. In many applications in x-ray imaging, x-ray energy of widely varying intensity must be accurately responded to by the detector. For example, relatively weak x-ray intensity can be expected when the object which is being imaged attenuates the x-ray beam. However, it is also typical, in x-ray imaging, to attempt to measure the intensity of the x-ray beam when it is not being attenuated by the object, so as to provide a reference level from which to gauge the attenuation imposed by the object being imaged. Thus another problem to be overcome is providing the detector with sufficient dynamic range so as to accurately measure the unattenuated x-ray intensity as well as the x-ray intensity when it is being attenuated by the object being imaged.

SUMMARY OF THE INVENTION

The invention meets these and other objects by employing a solid scintillating crystal (preferably cadmium tungstate) which has a front face exposed to impinging x-ray energy; the thickness of the crystal is selected in accordance with the desired stopping power (that is in relation to the intensity of the impinging x-ray energy). Only a portion of the front face of the crystal is actually exposed to the impinging x-ray energy, other (or protected) portions of the front face of the crystal are located behind an x-ray shield. The protected portions of the scintillating crystal are not employed as a scintillator at all, they are merely employed to couple the optical photons created in the scintillating crystal (that is, from portions actually exposed to the impinging x-ray energy) to an opto-electronic transducer which is located in contact with a different face of the crystal. The use of this, oversized crystal thus eliminates the necessity for interfacing different materials to transport the optical photons created in the scintillating crystal, to a location where they can be detected by an opto-electronic transducer.

In order to address problems which would otherwise be caused by varying numbers of optical photons being created as a function of the location of the impinging energy on the crystal, the opto-electronic transducer includes at least two elements, each located on a different "end" of the crystal. The electrical signals from these opto-electronic transducer elements are summed (by connecting the transducer elements in parallel with each other). As a result, one opto-electronic transducer element will respond more strongly to x-ray energy impinging closer to it, than it would respond to x-ray energy impinging further from it, but the other opto-electronic transducer element has a complementary characteristic so that when the currents produced by these two opto-electronic transducer elements are summed, the characteristic is relatively flat across the crystal.

In order to handle the necessity for wide dynamic range, the opto-electronic transducer function is performed by two opto-electronic transducers (each of which includes two opto-electronic transducer elements). A first of the opto-electronic transducers is characterized by a relatively small active area and a correspondingly small gain (ratio of current produced in the transducer to numbers of photons produced in the scintillator). This opto-electronic transducer can faithfully respond to relatively high x-ray intensities, but it alone would not have the desirable wide dynamic range which is required. Accordingly, a second opto-electronic transducer is provided with a relatively large active area such that it has a relatively large gain. This opto-electronic transducer will accurately respond to relatively weak x-ray intensities. The signals from these two opto-electronic transducers are coupled to different measuring chains. The signal from the second or large area opto-electronic transducer is employed unless the impinging x-ray intensity is so large that it is saturated. In that event, the signal from the other (small area) opto-electronic transducer is employed.

In a preferred embodiment of the invention the opto-electronic transducer elements are photodiodes which are located in contact with a face of the scintillating crystal.

Accordingly, the invention provides an x-ray detector especially suited for high energy applications with wide dynamic range, high stopping power and good protection for opto-electronic transducers comprising:

a) a solid scintillating crystal having a front face exposed to x-ray energy directed along an axis generally perpendicular to said front face, said solid scintillating crystal having a thickness, along said axis chosen to provide a desirable stopping power in relation to an intensity of said x-ray energy, b) a first opto-electronic transducer located outside a direct path of said x-ray energy and shielded from scattered x-ray energy by a relatively long dimension of said solid scintillating crystal, said first opto-electronic transducer located in contact with a face of said solid scintillating crystal generally perpendicular to said front face, and c) a second opto-electronic transducer located outside a direct path of said x-ray energy and shielded from scattered x-ray energy by said solid scintillating crystal, said second opto-electronic transducer located in contact with a face of said solid scintillating crystal generally perpendicular to said front face, said second opto-electronic transducer having an opto-electronic gain distinctly different from an opto-electronic gain of said first opto-electronic transducer whereby presence of said first and second opto-electronic transducers extends a dynamic range of said x-ray detector.

While cadmium tungstate is preferred, bismuth germanate has some similar properties and is also a preferred crystal. Both cadmium tungstate and bismuth germanate exhibit desirable, high radiation resistance and low afterglow.

BRIEF DESCRIPTION OF THE DRAWINGS

The present invention will now be described in further detail so as to enable those skilled in the art to practice the invention, in the following portions of this specification when taken in conjunction with the attached drawings in which like reference characters identify identical apparatus and in which.

DETAILED DESCRIPTION OF THE PREFERRED EMBODIMENT

Figure 1:
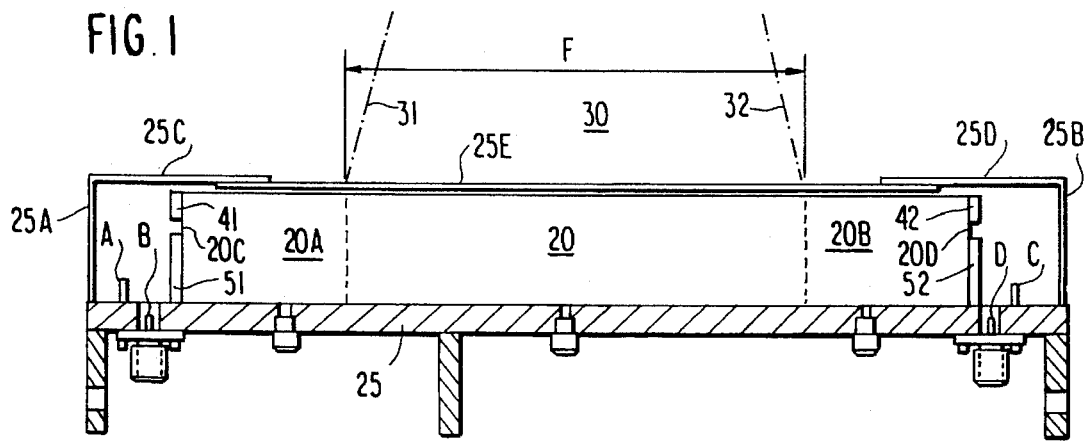
FIG. 1 is a cross-section of a typical detector in accordance with the present invention showing the relationship between the scintillating crystal, the photodiodes and the footprint of the impinging x-ray beam.
Figure 2:
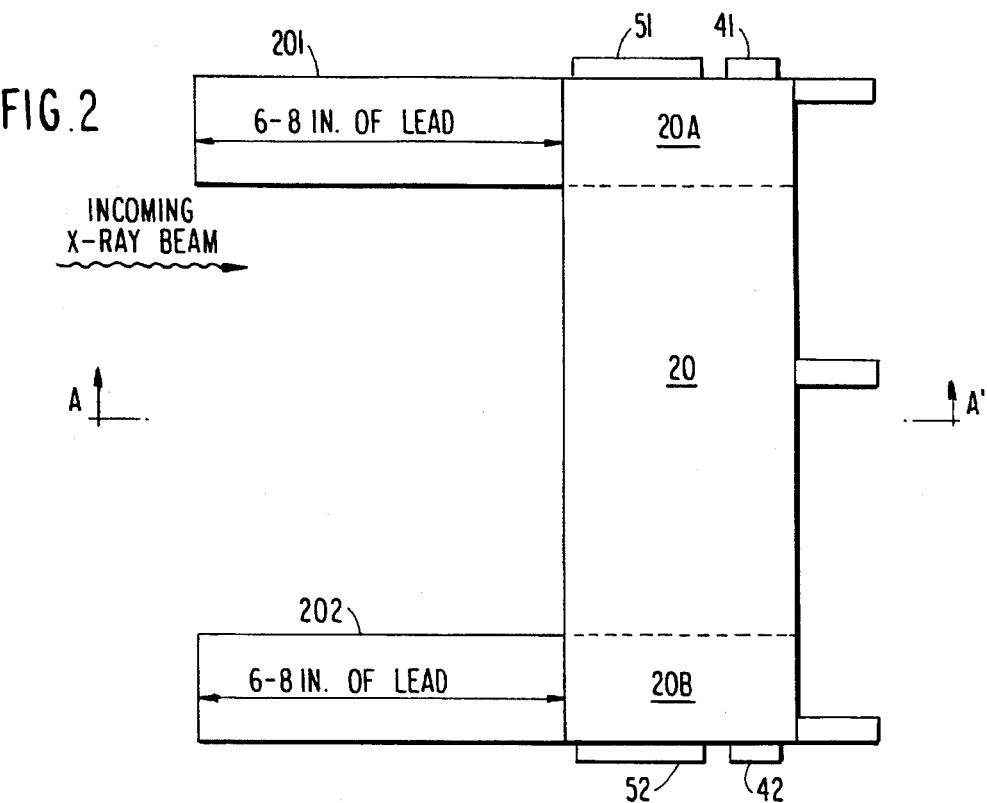
FIG. 2 is similar to FIG. 1 except that it also shows the shielding protecting portions of the detector from the x-ray energy.

FIG. 1 is a cross-section of a typical detector 10. The major components of the detector include a solid scintillating crystal 20 (preferably of cadmium tungstate or bismuth germanate), a plurality of opto-electronic transducers and a metallic housing such as the aluminum body 25. In a preferred embodiment the crystal had dimensions of about 6.7×0.9×0.19 inches. It is desirable that the selected crystal not unduly attenuate optical photons, at least over the distances involved. In one embodiment a clear crystal imposing less than 20% attenuation over 4 inches was used. The detector 10 is arranged so that the impinging x-ray energy 30 is confined within the outlines 31, 32. The footprint of the impinging x-ray energy has a dimension F which in a preferred embodiment was no more than the center 4 inches of the front face of the detector 20. As is shown in FIG. 2 portions of the front face of the detector 20 outside the footprint F are protected by x-ray shields 201, 202. For the particular energy level employed (on the order of 1 Mev or more, and in two embodiments 15 Mev and 5.5 Mev, respectively), the shields were 6–8 inches of lead (see FIG. 2). The aluminum housing 25 included upstanding walls 25A, 25B supporting front face extensions 25C and 25D. A protective covering 25E was supported by the front face portions 25C and 25D, and is designed to readily pass the impinging x-ray energy but to protect the detector from stray light, and other contamination.

The housing 25 includes four electrically insulated terminals A–D, two of these, A and C, can be connected to a ground or reference potential and the electrical signals provided by the opto-electronic transducers are taken at the terminals B and D, respectively.

Impinging x-ray energy interacts in the crystal 20 to produce optical photons. The photons are usually created in that portion of the crystal 20 exposed to x-ray energy, i.e. portions other than the protected portions 20A and 20B. The optical photons are coupled through the crystal body (including through protected portions of the crystal body 20A and 20B, thus the protected portions 20A and 20B of the crystal 20 serve as light pipes). This optical energy eventually impinges on the opto-electronic transducers where it is converted to electrical energy. As shown in FIG. 1 the crystal 20 includes side faces 20C and 20D, respectively, both generally perpendicular to the front face. Each of the faces 20C and 20D is associated with a pair of opto-electronic transducer elements, in particular face 20C is associated with transducer elements 41, 51 whereas face 20D is associated with transducer elements 42 and 52. Electrical leads (not illustrated) connect the transducer elements 41, 42, 51 and 52 to the electrically insulating terminals A–D. Because of these electrical interconnections, the transducer elements 41, 42 form an opto-electronic transducer which in a preferred embodiment comprised photodiodes, although it should be apparent that photomultipliers could have been used in lieu of photodiodes. Similarly, the elements 51, 52 were interconnected to form another opto-electronic transducer also comprising a photodiode. The protected portions 20A, 20B of the crystal 20 also serve to protect the opto-electronic transducers from the effects of x-ray energy which might be scattered in the unprotected portions of the crystal 20. As is conventional optical epoxy, which is highly light transmitting, is used at the photodiode/crystal interface.

The dimensions of the crystal 20 in the direction of the x-ray energy (that is, the length of the faces 20C or 20D) can be selected in accordance with the desired stopping power; as the x-ray energy increases in intensity, the length of these faces would be correspondingly increased.

FIG. 2 is similar to FIG. 1 except that it shows the shields 201, 202 which protect the portions 20A and 20B of the crystal 20 from "seeing" x-ray energy. It should be emphasized that the dotted lines in FIGS. 1 and 2 separating the protected portions 20A, 20B of the crystal 20 from other portions are conceptual only, and physically correspond solely to the projection of the edge of the shields 201, 202.

Figure 3:
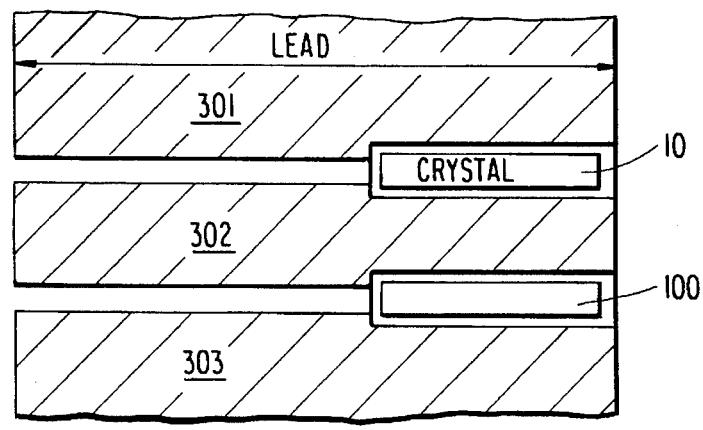
FIG. 3 is a cross-section on the line A—A' of FIG. 2 showing two adjacent detectors and the relevant shielding.

FIG. 3 is a cross-section of FIG. 2 taken on the line A—A' showing a plurality of detectors, e.g. the detector 10 and its adjacent detector 100, both of which are protected by additional lead shielding 301, 302 and 303. The open areas lying between the shields 301–303 form x-ray beam paths, through which the impinging x-ray energy travels.

Figure 4:
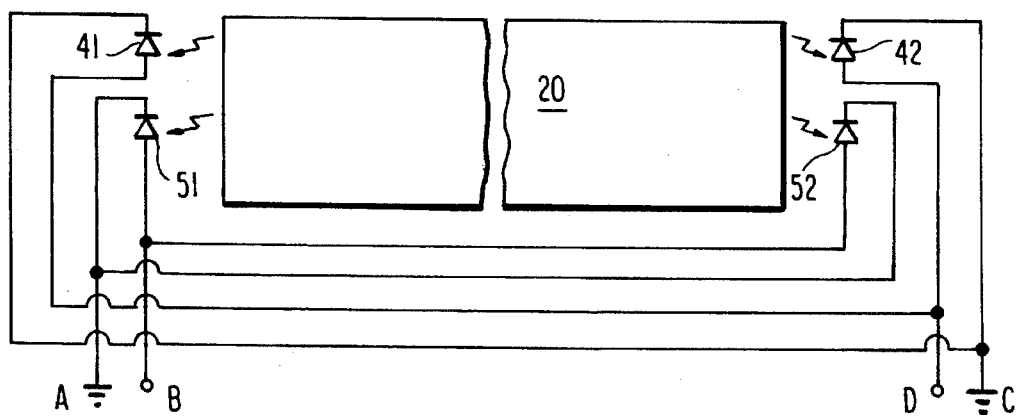
FIG. 4 is an electrical diagram illustrating the physical relationship between the photodiodes and the scintillating crystal as well as the interconnection of the photodiodes to each other.

FIG. 4 is an electrical interconnection diagram illustrating both the manner in which the opto-electronic transducer elements are interconnected with each other, and the manner in which they cooperate with the crystal 20. More particularly, the grounded terminal C is coupled to the cathode of transducer element 42 and coupled in parallel to the cathode of the transducer element 41. The anodes of the transducer elements 41, 42 are coupled together to the terminal D. In a similar fashion, the cathodes of the opto-electronic transducer elements 51, 52 are connected to the grounded terminal A, whereas the anodes of these opto-electronic transducer elements are connected to the terminal B. Electrical current corresponding to detected optical photons is available at the terminals B, D for connection to amplifiers and other measuring instruments.

In the preferred embodiment in which the opto-electronic transducer elements are photodiodes, the active areas of the photodiode are selected so as to give the appropriate gain. More particularly, the active area of the elements 51, 52 is relatively large, whereas the active area of the elements 41, 42 is relatively smaller; for example a ratio of active areas of about 10:1 is suggested, in one embodiment the actual ratio was 7:1. In the preferred embodiment the active area of each of the elements 51, 52 is greater than 100 mm$^2$ whereas the active area of each of the elements 41, 42 was less than 10 mm$^2$. It should be apparent that similar dimensions for the active regions of respective photomultipliers could provide the same effect of distinctly different gains for the transducers 41, 42 as opposed to the transducers 51, 52. In the preferred embodiment the same amount of optical energy generated 2 nanoamperes in the large area diodes but only 20 picoamperes in the small area diodes.

Figure 5:
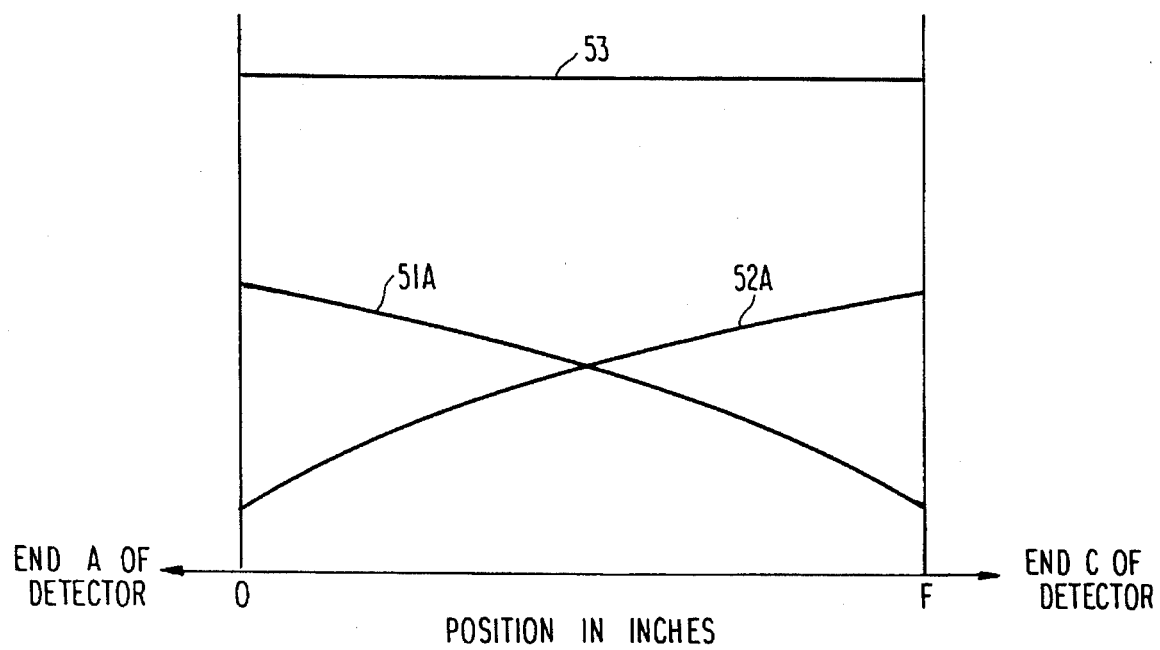
FIG. 5 illustrates the response characteristic of a pair of photodiodes as a function of impinging energy at different locations in the crystal and the response of the pair of photodiodes when interconnected.

The use of a transducer with elements on opposite sides of the crystal 20 enhances the uniformity of the response; this is shown in FIG. 5. FIG. 5 shows curves 51A and 52A which are respectively the response of the detectors 51, 52 to illumination of the crystal 20 as a function of that illumination across the front face of the crystal. As is apparent from FIG. 5, as the position of the illumination varies across the front face of the crystal 20, the current produced by the photodiode 51 also varies. More particularly, as the position of the illumination recedes from the location of the photodiode 51, the current produced by the photodiode decreases. The same characteristic is true of the response 52A of the photodiode 52. By summing the currents produced by the photodiodes 51, 52 the characteristic 53 is produced which is relatively insensitive to the position of the illumination along the crystal.

From the foregoing, those skilled in the art will appreciate that many changes can be made to the preferred embodiment which are within the spirit and scope of the invention, which is to be determined by the claims which follow.

Having thus described our invention, what we claim as new, and desire to secure by Letters Patent is:

1. An x-ray detector for high energy applications and having protection for opto-electronic transducers comprising:

a) a solid scintillating crystal having a front face exposed to x-ray energy directed along an axis generally perpendicular to said front face, said solid scintillating crystal having a thickness, along said axis chosen to provide a desirable stopping power in relation to an intensity of said x-ray energy, b) a first opto-electronic transducer located outside a direct path of said x-ray energy and shielded from scattered x-ray energy by a relatively long dimension of said solid scintillating crystal, said first opto-electronic transducer located in light coupling relation with a face of said solid scintillating crystal generally perpendicular to said front face, and c) a second opto-electronic transducer located outside a direct path of said x-ray energy and shielded from scattered x-ray energy by said solid scintillating crystal, said second opto-electronic transducer located in light coupling relation with a face of said solid scintillating crystal generally perpendicular to said front face, said second opto-electronic transducer having a gain distinctly different from a gain of said first opto-electronic transducer wherein presence of said first and second opto-electronic transducers extends a dynamic range of said x-ray detector.

2. The x-ray detector of claim 1 which further includes first and second x-ray shield means located adjacent said front face to shield a portion of said front face of said solid scintillating crystal from said x-ray energy.

3. The x-ray detector of claim 1 in which said scintillating crystal is cadmium tungstate.

4. The x-ray detector of claim 1 in which said scintillating crystal is bismuth germanate.

5. The x-ray detector of claim 1 in which said first and second opto-electronic transducers are photodiodes located in contact with faces of said crystal wherein said photodiodes are formed with different active areas so as to provide said distinctly different gains.

6. The x-ray detector of claim 1 in which at least one of said opto-electronic transducers includes first and second opto-electronic transducer elements, each element located in contact with a different face of said solid scintillating crystal, each of said faces generally perpendicular to said front face.

7. The x-ray detector of claim 1 in which both said opto-electronic transducers include first and second opto-electronic transducer elements, each element of a transducer located in contact with a different face of said solid scintillating crystal, each of said faces perpendicular to said front face.

8. The x-ray detector of claim 7 which further includes first and second x-ray shield means located adjacent said front face to shield a portion of said front face of said solid scintillating crystal, wherein said opto-electronic transducers are protected from said x-ray energy by said shield means.

9. The x-ray detector of claim 8 in which each of said opto-electronic transducer elements is a photodiode.

10. The detector of claim 9 in which active areas of said photodiodes are in a ratio of about 10:1.

11. The detector of claim 9 in which active areas of said photodiodes are in a ratio of about 7:1.

12. An X-ray detector comprising:

means for mounting a scintillating crystal in an x-radiation field, a protective shield for inhibiting transmission of x-radiation into protected regions of space, said protective shield having a dimension selected in relation to intensity of said x-radiation field, a solid scintillating crystal including a first component which is directly exposed to x-radiation and at least a protected second component lying in said protected regions and thus not directly exposed to said x-radiation, said scintillating crystal having a dimension which is selected in relation to intensity of said X-radiation so as to provide adequate stopping power, opto-electronic transducer means in light coupling relation to a protected portion of said scintillating crystal for converting incident optical photons, produced by interaction of said x-radiation in said crystal, into electrical signals, said opto-electronic transducer means located in said protected regions, said opto-electronic transducer means includes first and second photodiodes each in contact with said crystal, said second photodiode having an active area about ten times greater than an active area of said first photodiode, wherein said opto-electronic transducer means is protected from exposure to direct x-radiation by said protective shield and is protected from exposure to scattered x-radiation by said protected component of said crystal.

13. An x-ray detector comprising:

means for mounting a scintillating crystal in an x-radiation field, a protective shield for inhibiting transmission of x-radiation into protected regions of space, said protective shield having a dimension selected in relation to intensity of said x-radiation field, a solid scintillating crystal including a first component which is directly exposed to x-radiation and at least a protected second component lying in said protected regions and thus not directly exposed to said x-radiation, said scintillating crystal having a dimension which is selected in relation to intensity of said x-radiation so as to provide adequate stopping power, opto-electronic transducer means in light coupling relation to a protected portion of said scintillating crystal for converting incident optical photons, produced by interaction of said x-radiation in said crystal, into electrical signals, said opto-electronic transducer means located in said protected regions, said opto-electronic transducer means includes a first and second photodiode, each located in contact with a different opposing face of said crystal, each of said photodiodes having electrical leads, means connecting corresponding leads of said first and second photodiodes together, wherein said opto-electronic transducer means is protected from exposure to direct x-radiation by said protective shield and is protected from exposure to scattered x-radiation by said protected component of said crystal.

14. The detector of claim 12 or 13 in which said scintillating crystal is cadmium tungstate.

15. The detector of claim 12 or 13 in which said scintillating crystal is bismuth germanate.

16. The detector of claim 12 in which said opto-electronic transducer means includes first and second pairs of photodiodes, each photodiode in one pair having an equal active area which is different from an active area of the photodiodes of the other pair, each of the photodiodes of a pair located in contact with opposed faces of said crystal, each of said photodiodes having anode and cathode leads, and means connecting corresponding leads of each pair of photodiode together.

17. The detector of claim 16 in which one pair of said photodiodes has an active area about ten times the active area of the other photodiodes.

* * * * *